United States Patent [19]

Sano

[11] Patent Number: 4,702,550

[45] Date of Patent: Oct. 27, 1987

[54] OPTICAL FIBER FREQUENCY FILTER AND MULTIPLEXER USING SAME

[75] Inventor: Yasukazu Sano, Kanagawa, Japan

[73] Assignee: Fuji Electric Company, Ltd., Kanagawa, Japan

[21] Appl. No.: 459,909

[22] Filed: Jan. 21, 1983

[30] Foreign Application Priority Data

| Mar. 8, 1982 [JP] | Japan | 57-36246 |
| Mar. 8, 1982 [JP] | Japan | 57-36247 |
| Mar. 8, 1982 [JP] | Japan | 57-36248 |

[51] Int. Cl.⁴ .............. G02B 6/28; H04B 9/00
[52] U.S. Cl. ................ 350/96.16; 350/96.15; 350/96.29; 350/311; 370/3; 370/4
[58] Field of Search ............ 350/311, 317; 455/600, 455/602, 611, 617

[56] References Cited

U.S. PATENT DOCUMENTS

| 3,676,684 | 7/1972 | DeLange | 370/1 |
| 3,986,020 | 10/1976 | Kogelnik | 350/96.16 |
| 4,128,759 | 12/1978 | Hunt et al. | 350/96.15 |
| 4,145,110 | 3/1979 | Szentesi | 350/96.15 |
| 4,166,212 | 8/1979 | Judeinstein | 350/96.16 |
| 4,182,935 | 1/1980 | Chown | 350/96.15 |
| 4,341,438 | 7/1982 | Seki et al. | 350/96.16 |
| 4,406,513 | 9/1983 | Raphael | 350/96.16 |
| 4,441,181 | 4/1984 | Winzer et al. | 350/96.19 |
| 4,483,582 | 11/1984 | Sheem | 350/96.15 |
| 4,511,207 | 4/1985 | Newton et al. | 350/96.15 |
| 4,558,920 | 12/1985 | Newton et al. | 350/96.15 |
| 4,588,255 | 5/1986 | Tur et al. | 350/96.16 |
| 4,662,715 | 5/1987 | Shutterly | 350/96.16 |

FOREIGN PATENT DOCUMENTS

| 57-62034 | 4/1982 | Japan | 350/96.16 |
| 0754351 | 8/1980 | U.S.S.R. | 350/96.14 |

OTHER PUBLICATIONS

Aoyama et al, "Optical Demultiplexer . . . System", Applied Optics, 4/79, vol. 18, No. 8, pp. 1253–1258.
Miyauchi et al, "Compact Wavelength . . . Pieces Optics Letters, 7/80, vol. 5, No. 7, pp. 321–322.

*Primary Examiner*—William L. Sikes
*Assistant Examiner*—Brian M. Healy
*Attorney, Agent, or Firm*—Sughrue, Mion, Zinn, Macpeak and Seas

[57] ABSTRACT

An optical frequency filter for selectively blocking or transmitting an amplitude-modulated optical signal. In a first embodiment of the invention, an optical coupler adds two optical inputs. The output of the optical coupler is delayed and attenuated and then applied to the input of an optical splitter. One output port of the optical splitter is applied to one input port of the optical coupler, with the optical signal to be filtered applied to the other input port of the coupler. The filtered output signal is produced at the second output port of the splitter. In a second embodiment, the delay and attenuation are performed between the output of the splitter and the input of the coupler. In a third embodiment, the signal to be filtered is applied to the input port of an optical splitter. One of the output ports of the splitter is coupled through a delay to one input port of an optical combiner, while the other output port of the splitter is delayed and coupled to the other input port of the coupler.

18 Claims, 12 Drawing Figures

OPTICAL FIBER FREQUENCY FILTER AND MULTIPLEXER USING SAME

BACKGROUND OF THE INVENTION

The present invention relates to an optical frequency filter used to block or transmit an optical signal that is amplitude-modulated at a particular frequency, according to the modulation frequency and to an optical multiplexing circuit constructed by using the optical frequency filter.

Figure 1:
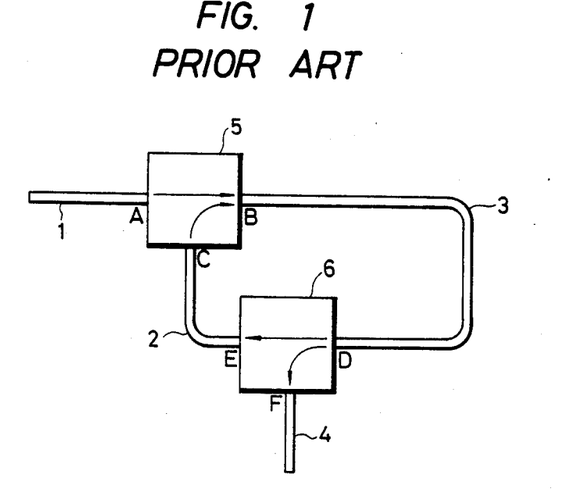
FIG. 1 is a block diagram showing a filter.

An optical frequency filter, as shown in FIG. 1, is disclosed by the present inventor in the Japanese Laid-Open Patent Publication No. 57-62034 published on Apr. 14, 1982. In this filter an optical coupler 5 and an optical splitter 6 are connected with optical fibers 1 through 4.

In order to derive the frequency characteristic of the filter in FIG. 1, specific parameters will be defined as follows:

$I_i(t)$: intensity of light applied to the incident fiber 1,
$I_o(t)$: intensity of light emerging from the emergent fiber 4,
$I_m(t)$: intensity of light at the point E,
$G(s)$: transmission function of the filter expressed by Laplace transformation,
$\omega$: angular frequency of the modulation wave,
$t$: time,
$T_d$: time required for light to transit through the entire fiber 3 (between the points B and D), $$I_o(S) = \epsilon_1\epsilon_2\epsilon_3 e^{-Tds}I_i(s) + \epsilon_2\epsilon_3\epsilon_5\epsilon_6 e^{-Tds}I_m(s), \quad (3)$$

and $$I_m(s) = \epsilon_1\epsilon_2\epsilon_4 e^{-Tds}I_i(s) + \epsilon_2\epsilon_4\epsilon_5\epsilon_6 e^{-Tds}I_m(s). \quad (4)$$

When rearranged, $$I_o(s) = \frac{\epsilon_1\epsilon_2\epsilon_3}{e^{Tds} - \epsilon_2\epsilon_4\epsilon_5\epsilon_6} I_i(s). \quad (5)$$

Therefore, $$G(s) = \frac{\epsilon_1\epsilon_2\epsilon_3}{e^{Tds} - \epsilon_2\epsilon_4\epsilon_5\epsilon_6}. \quad (6)$$

Accordingly, the filter's frequency characteristic L is as indicated by the following expression (7):

$$L = 10 \cdot \log G(j\omega) \quad (7)$$

$$= 10 \cdot \log\{\epsilon_1\epsilon_2\epsilon_3[1 + \epsilon_2{}^2\epsilon_4{}^2\epsilon_5{}^2\epsilon_6{}^2 - 2\epsilon_2\epsilon_4\epsilon_5\epsilon_6\cos(\omega \cdot T_d)]^{-\frac{1}{2}}\}$$

Figure 2:
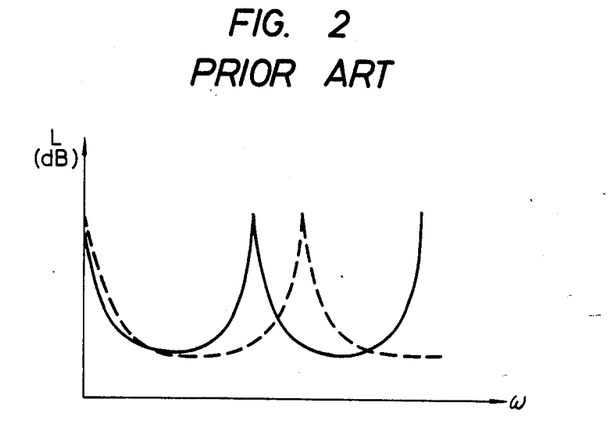
FIG. 2 is a graphical representation indicating the frequency characteristic of the filter in FIG. 1.

In expression (7), $\beta_1$ through $\beta_6$ and $T_d$ are constants. Accordingly, filter in FIG. 1 is disadvantageous in that the frequency characteristic thereof (or the quality factor Q of the filter) cannot be adjusted. Furthermore, the filter has a repetitive bandpass characteristic as shown in FIG. 2 (the characteristic curve indicacted by the dotted line being described later). Accordingly, the filter can pass a particular signal, but it cannot reject a specified signal.

SUMMARY OF THE INVENTION

A first object of this invention is to provide a filter having a frequency characteristic (or quality factor Q) which can be adjusted.

A second object of the invention is to provide a filter which is a repetitive band rejection filter (repetitive notch filter) which can reject specified signals.

The first object of the invention has been achieved by the provision of a filter which, according to the invention, comprises adding means for adding two optical inputs, means for delaying and attenuating the result of addition provided the adding means, and means for outputting a part of the light which has been delayed and attenuated thereby and for delaying and attenuating the remaining light and applying the remaining light thus delayed and attenuated as one optical input, the adding means receiving as the other optical input light which is amplitude-modulated at a certain frequency.

The second object of the invention has been achieved by the provision of a filter, which, according to the invention, comprises splitting means for splitting one optical input into two optical outputs, means for and delaying one of the two optical outputs, and means for adding the two optical outputs, one being delayed, the splitting means receiving light which is amplitude-modulated at a given frequency.

The nature, principle and utility of the invention will become more apparent from the following detailed description and the appended claims when read in conjunction with the accompanying drawings.

DESCRIPTION OF THE PREFERRED EMBODIMENTS

Figure 3:
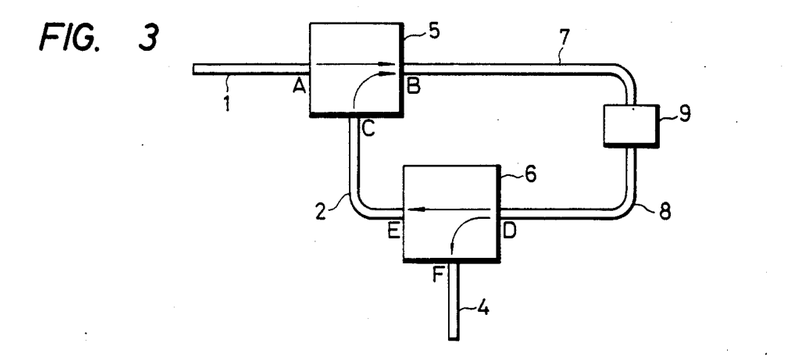
FIG. 3 is a block diagram showing a first example of a filter according to the invention.

A first example of an optical frequency filter according to the invention is shown in FIG. 3. The filter shown in FIG. 3 differs from the filter of FIG. 1 in that the fiber 3 in FIG. 1 is replaced by fibers 7 and 8 and an optical variable attenuator 9 coupled between the fibers 7 and 8. The characteristic of the filter can be changed by controlling the optical variable attenuator 9, that is, by controlling the amount of attenuation thereof.

Figure 4:
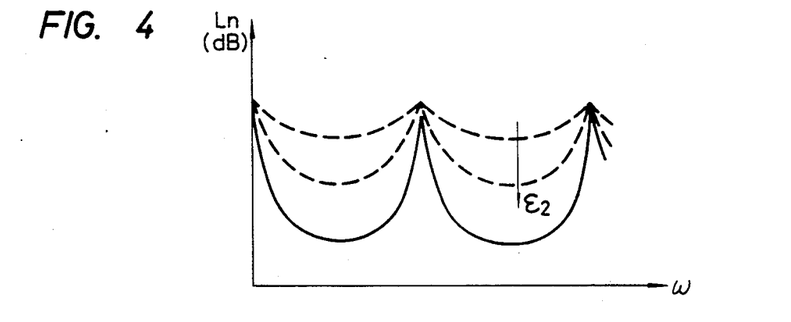
FIG. 4 is a graphical representation showing the for frequency characteristic of the filter of FIG. 3.

The frequency characteristic of the filter of FIG. 3 is similar to that expressed by equation (7), except that $\epsilon_2$ is variable. The frequency characteristic $L_n$ of the filter of FIG. 3 (with $\omega=0$) is indicated by equation (8) below and FIG. 4:

$$L_n = 10 \cdot \log \frac{(1 - \epsilon_2\epsilon_4\epsilon_5\epsilon_6)}{[1 + \epsilon_2{}^2 \epsilon_4{}^2 \epsilon_5{}^2 \epsilon_6{}^2 - 2\epsilon_2\epsilon_4\epsilon_5\epsilon_6 \cos(\omega \cdot T_d)]^{\frac{1}{2}}} \quad (8)$$

It is apparent from equation (8), that the quality factor Q of the filter can be increased by decreasing $\epsilon_2$.

The optical variable attenuator 9 can be replaced by an attenuator having a constant attenuation. In this case, the quality factor Q is smaller than that in the case of FIG. 1.

Figure 5:
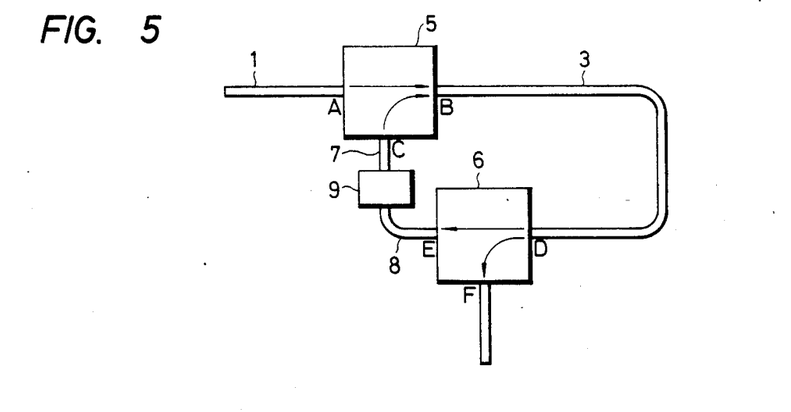
FIG. 5 is a block diagram showing a modification of the filter of FIG. 3.

In a second embodiment, the optical variable attenuator 9 may be coupled in series with the fiber 2 as shown in FIG. 5. In this case, the frequency characteristic $L_n$ (with $\omega=0$) is indicated by equation (8) similarly. However, unlike the case of FIG. 3, instead of $\epsilon_2$, $\epsilon_5$ varies with the attenuation of the optical attenuator 9. It is apparent from equation (8) that, even when $\beta_5$ instead of $\epsilon_2$) changes as above, the basic operation of the filter is completely same as that in the case of FIG. 3.

As is apparent from the above description, according to the invention, the filter characteristic (or the filter quality factor Q) can be set to various values in association with the amount of attenuation provided by the optical variable attenuator 9. Thus, the filter according to the invention is very flexible in its application compared with the filter of FIG. 1.

Next, a specific application of the filter according to the invention will be described.

As discussed above, the transmission factor G(s) of the filter according to the invention is completely identical to that expressed by equation (6), except that $\epsilon_2$ or $\epsilon_5$ is not constant and the transmission factor is controlled by the optical variable attenuator. If a unitary optical impulse input is applied to the filter of FIG. 3, the input $I_i(s)$ is indicated by the following equation (9). The filter output can then be expressed by equation (10) or (11):

$$I_i(s) = (e^{-as} - e^{-bs})/s \quad (9)$$

$$I_o(s) = G(s) \cdot I_i(s) \quad (10)$$

$$= \frac{\epsilon_1\epsilon_2\epsilon_3}{(e^{T_d s} - \epsilon_2\epsilon_4\epsilon_5\epsilon_6)} \cdot \frac{(e^{-as} - e^{-bs})}{s}$$

By subjecting equation (10) to inverse Laplace transformation, and with u(t) representing a unit step function:

$$I_o(t) = \epsilon_1\epsilon_2\epsilon_3 \left[ \{u(t - a - T_d) - u(t - b - T_d)\}(\epsilon_2\epsilon_4\epsilon_5\epsilon_6)^0 + \{u(t - a - 2T_d) - u(t - b - 2T_d)\}(\epsilon_2\epsilon_4\epsilon_5\epsilon_6)^1 + \{u(t - a - 3T_d) - u(t - b - 3T_d)\}(\epsilon_2\epsilon_4\epsilon_5\epsilon_6)^2 + \ldots \right]. \quad (11)$$

From equation (11), it is clear that the rate of convergence with time of $I_o(t)$ depends on the magnitude of $(\epsilon_2\epsilon_4\epsilon_5\epsilon_6)$. That is, in the filter of FIG. 3 in which $\epsilon_2$ can be adjusted and accordingly $(\epsilon_2\epsilon_4\epsilon_5\epsilon_6)$ can be adjusted, resultantly, the response of the filter to an impulse input can be controlled by adjusting the amount of attenuation of the optical variable attenuator. This is analogous to varying the factor R in an RC electrical delay circuit.

Figure 6:
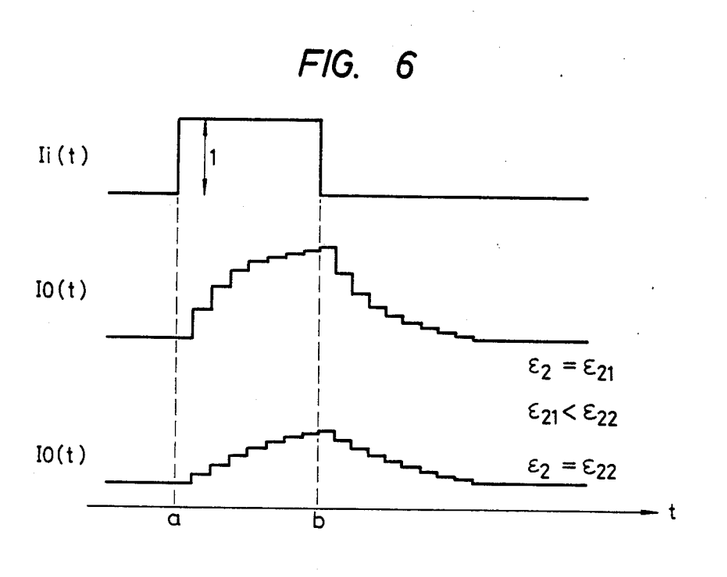
FIG. 6 is a timing chart for a description of the impulse response of a filter according to the invention.
Figure 7:
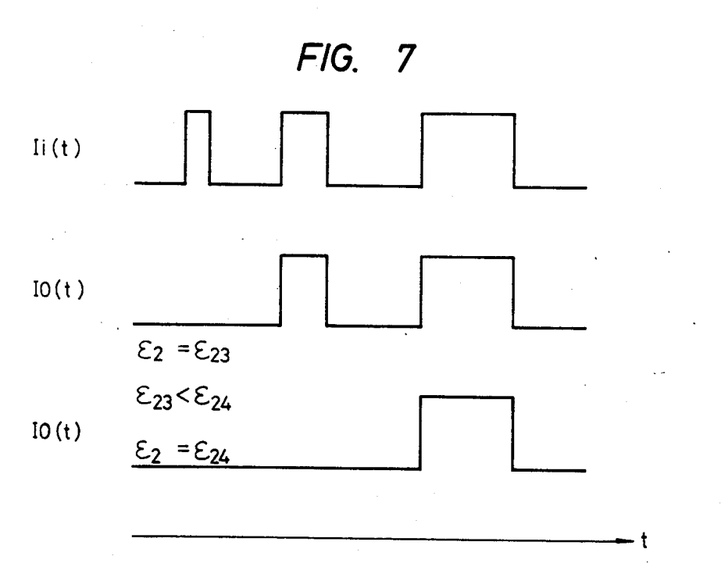
FIG. 7 is a timing chart for a description of the noise eliminating characteristic of a filter according to the invention.

The manner of control of the response is illustrated in FIG. 6. FIG. 7 illustrates that, when the filter is applied to an optical circuit adapted to eliminate a noise-like optical impulse input and pass only a particular desired signal, the magnitude of noise which is eliminated or suppressed thereby can be adjusted by controlling the amount of attenuation of the optical variable attenuator. This adjustment, which cannot be achieved by the prior art arrangement, is one of the specific features of the invention.

In the above-described filter, an optical fiber is employed as a delay line between the points B and D in FIG. 3 or 5. However, the delay line may be replaced by reflecting parallel surfaces between which multiple reflection is carried out, or a light delaying element made of GaAs or the like having a higher refractive index that the optical fiber.

Figure 8:
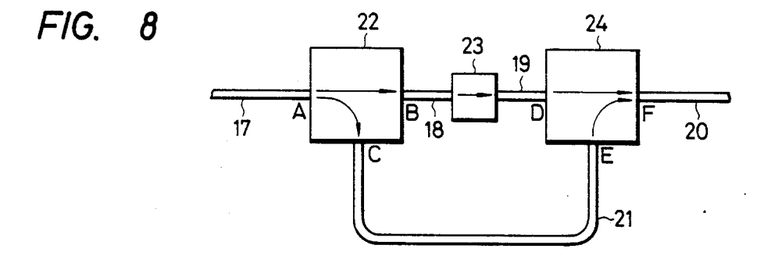
FIG. 8 is a block diagram showing another example of a filter according to the invention.

Another example of a filter according to the invention, specifically, for achieving the second object of the invention, is shown in FIG. 8. In order to derive the frequency characteristic of the filter in FIG. 8, parameters are defined as follows:

$I_i(t)$: intensity of light applied to an incident fiber 17,
$I_o(t)$: intensity of light emerging from an emergent fiber 20,
G(s): transmission function of the filter expressed by Laplace transformation,
$\omega$: angular frequency of a modulation wave,
t: time,
$T_d$: time required for light to transit the entire fiber 21 (between the points C and E),
$\eta_1$: optical transmissivity of the path between the points A and B,
$\eta_2$: optical transmissivity of the path between the points B and D,
$\eta_3$: optical transmissivity of the path between the points D and F,
$\eta_4$: optical transmissivity of the path between the points A and C,
$\eta_5$: optical transmissivity of the path between the points C and E (corresponding to the entire length of the fiber 21), and
$\eta_6$: optical transmissivity of the path between the points E and F.

Under the conditions that (1) the frequency characteristics of the fibers 17 through 21, optical splitter 22 and optical coupler 24 are completely flat in the frequency band of $\omega$, and (2) the length of the fiber 21 is much longer than the sum of the lengths of the fibers 18 and 19 so that the time required for light to transit the path which extends from the point B through the fiber 18, the optical variable attenuator 23 and the fiber 19 to the point C can be disregarded, being much shorter than the time $T_d$ required for light to transit the fiber 21, the transmission function in FIG. 8 can be approximated as follows:

$$I_o(t) = \eta_1\eta_2\eta_3 I_i(t) + \eta_4\eta_5\eta_6 I_i(t - T_d). \quad (12)$$

The following equation (13) is obtained by subjecting equation (12) Laplace transformation:

$$I_o(s) = (\eta_1\eta_2\eta_3 + \eta_4\eta_5\eta_6 e^{-T_d s}) I_i(s). \quad (13)$$

Accordingly, $$G(s)_f = \eta_1\eta_2\eta_3 + \eta_4\eta_5\eta_6 \, e^{-T_{df}s}. \quad (14)$$

Therefore, the filter's frequency characteristic $L_f$ can be expressed as follows:

$$L_f = 10 \cdot \log G(j\omega) \quad (15)$$

$$= 10 \cdot \log [\eta_1{}^2\eta_2{}^2\eta_3{}^2 + \eta_4{}^2\eta_5{}^2\eta_6{}^2 +$$

$$2\eta_1\eta_2\eta_3\eta_4\eta_5\eta_6 \cos(\omega \cdot T_{df})]^{\frac{1}{2}}$$

Figure 9:
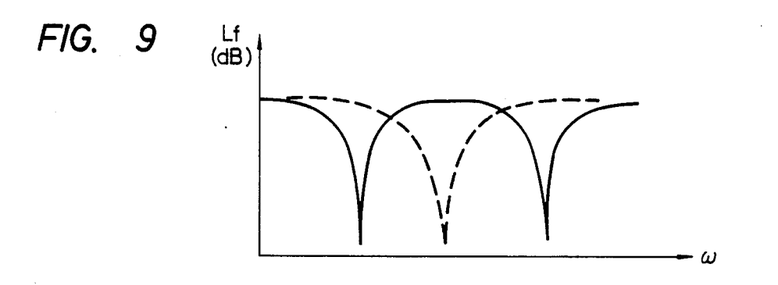
FIG. 9 is a graphical representation indicating the frequency characteristic of the filter of FIG. 8.

Equation (15) is graphed in FIG. 9. As is apparent from FIG. 9, the filter has a repetitive band rejection characteristic.

As is clear from the above description, the filter of FIG. 8 can reject a specific unwanted signal more effectively than the filter of FIG. 1. This is another of the specific features of the filter of the invention.

As is apparent from equation (15), when the constants are selected to meet the following expression (16), then $\cos(\omega \cdot T_{df}) = -1$, and $L_f$ becomes negatively indefinite, whereby a so called zero circuit is formed. This is yet another specific feature of the filter of the invention:

$$\eta_1\eta_2\eta_3 = \eta_4\eta_5\eta_6. \quad (16)$$

The optical variable attenuator 23 of FIG. 8 is one example for which equation (16) is satisfied. In general, when the following equation (17) is satisfied:

$$\eta_1\eta_2\eta_3 = K\, \eta_4\eta_5\eta_6, \quad (17)$$

the quality factor Q of the filter can be adjusted by controlling the factor K as is clear from equation (15).

Figure 12:
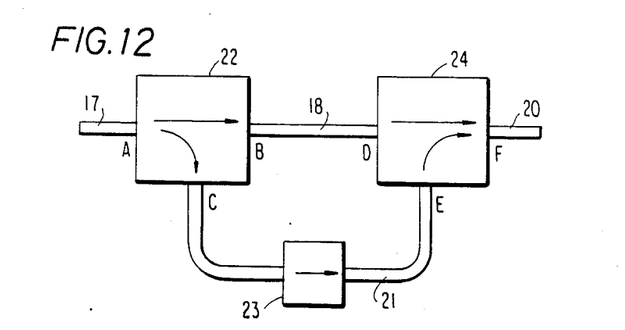
FIG. 12 shows a modification of the filter of FIG. 8.

In order to adjust the factor K, as shown in FIG. 12, the optical variable attenuator 23 may be inserted between the points C and E, or two attenuators 23 may be inserted, respectively, between the points B and D and between the points C and E.

Figure 11:
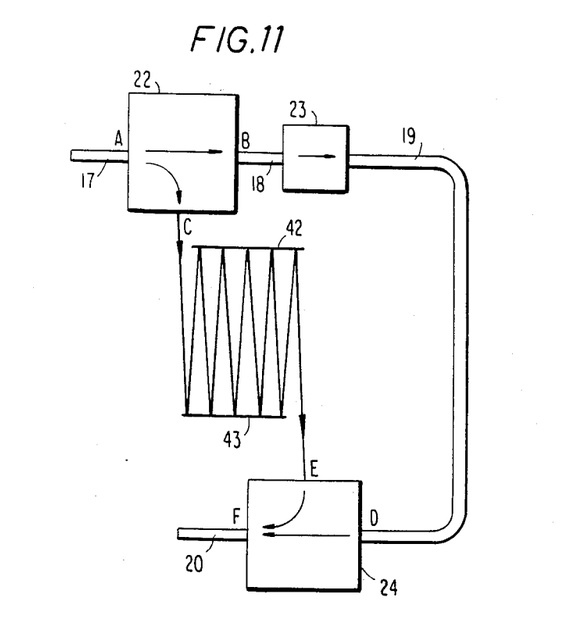
FIG. 11 is a block diagram showing still another example of a filter according to the invention.

In the filter of FIG. 8, the delay line 21 is an optical fiber which forms the long optical path. Similarly as in the case of the first example of the filter of the invention, the delay line may be replaced by reflecting parallel surfaces between which multiple reflection is carried out, or a light delay element made of GaAs or the like having a higher refractive index than the optical fiber. For example, as shown in FIG. 11, the delay line 21 is replaced by two reflecting surfaces 42 and 43 disposed parallel to one another.

In the case of the filters shown in FIGS. 1 and 8, as is apparent from equations (7) and (15), the frequency characteristics of the filters depends on $T_d$ and $T_{df}$, that is, on the lengths of the fibers 3 (FIG. 1) and 21 (FIG. 8).

Figure 10:
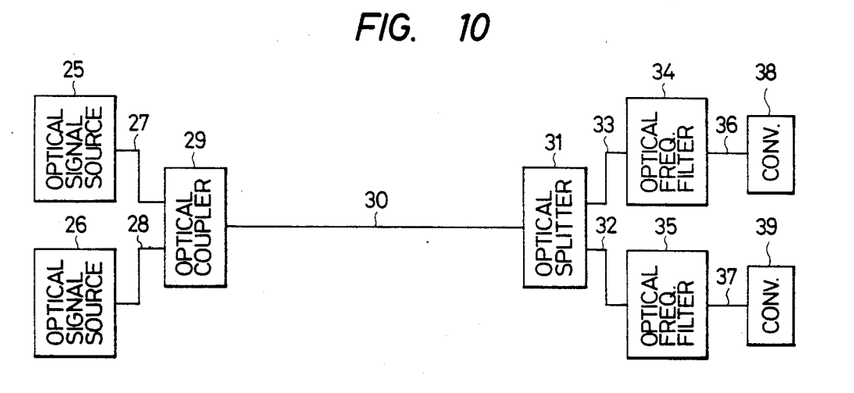
FIG. 10 is a block diagram showing the arrangement of an optical multiplexing circuit using the filter in FIG. 1.

The solid lines and the dotted lines in FIGS. 2 and 9 indicate the frequency characteristics of the two filters with time delays $T_d$ and $T_{df}$. It can be appreciated from these characteristics that an optical frequency doubling circuit can be realized by forming an optical circuit as shown in FIG. 10 with the filter of FIG. 1. In FIG. 10, reference numerals 25 and 26 designate optical signal sources intensity-modulated at frequencies $f_1$ and $f_2$, respectively; 27, 28, 30, 32, 33, 36 and 37 optical fibers; 29 an optical coupler; 31 an optical splitter; 34 an optical frequency filter adapted to transmit the frequency $f_1$ and to block the frequency $f_2$; 35 an optical frequency filter adapted to block the frequency $f_1$ and to transmit the frequency $f_2$; and 38 and 39 photoelectric converters. In FIG. 10, the two optical frequency filters have different values of $T_d$ and have frequency characteristics as indicated by the solid line and the broken line in FIG. 2, for instance. It can be readily understood that an optical multiplexing cirucit such as an optical tripling circuit can be realized in the same manner. It is further evident that an optical multiplexing circuit can be obtained by using the optical frequency filter of FIG. 8.

Thus, a complete optical mulitplexing circuit in which is not necessary to convert the optical signals into electrical signals can be constructed with a single light source. In this case, unlike the case of wavelength multiplexing which requires the provision of a light source having a highly accurate wavelength, an optical multiplexing circuit can be provided at low cost using the invention.

I claim:

1. An optical filter comprising:
   optical adding means having first and second input ports and an output port, an optical input signal to be filtered being applied to said first input port;
   optical splitting means having an input port and first and second output ports, said first output port of said optical splitting means being coupled to said second input port of said optical adding means, a filtered output signal being produced at said second output port of said optical splitting means; and
   optical delaying means and optical attenuating means coupled in series with one another between said output port of said optical adding means and said input port of said optical splitting means.

2. The optical filter of claim 1, wherein said optical attenuating means comprises variable attenuating means.

3. The optical filter of claim 1, wherein said optical delayed means comprises an optical fiber.

4. The optical filter of claim 1, wherein said optical delaying means comprises first and second mirrors arranged to multiply reflect an optical signal therebetween.

5. An optical filter comprising:
   optical adding means having first and second input ports and an output port, an optical input signal to be filtered being applied to said first input port;
   optical splitting means having an input port and first and second output ports, a filtered output signal being produced at said second output port of said optical splitting means;
   optical attenuating means coupled between said first output port of said optical splitting means and said second input port said optical adding means; and
   optical delaying means coupled between said output port of said optical adding means and said input port of said optical splitting means.

6. The optical filter of claim 5, wherein said optical attenuating means comprises variable attenuating means.

7. The optical filter of claim 5, wherein said optical delaying means comprises an optical fiber.

8. The optical filter of claim 5, wherein said optical delaying means comprises first and second mirrors arranged to multiply reflect an optical signal therebetween.

9. An optical filter comprising:
   optical splitting means having an input port and first and second output ports, an optical input signal to be filtered being applied to said input port;
   optical adding means having first and second input ports and an output port, said second input port of said optical adding means being coupled to said second output port of said optical splitting means, a filtered output signal being produced at said output port of said optical adding means; and optical delaying means and optical attenuating means coupled in series with one another between said first output port of said optical splitting means and said first input port of said optical adding means.

10. The optical filter of claim 9, wherein said optical delaying means comprises an optical fiber.

11. The optical filter of claim 9, wherein said optical delaying means comprises first and second mirrors arranged to multiply reflect an optical signal therebetween.

12. The optical filter of claim 9 wherein said optical attenuating means comprises variable attenuating means.

13. An optical filter comprising:

optical splitting means having an input port and first and second output ports, an optical input signal to be filtered being applied to said input port;

optical adding means having first and second input ports and an output port, a filtered output signal being produced at said output port of said optical adding means;

optical delaying means coupled between said first output port of said optical splitting means and said first input port of said optical adding means; and optical attenuating means coupled between said second output port of said optical splitting means and said second input port of said optical adding means.

14. The optical filter of claim 13, wherein said optical attenuating means comprises variable attenuating means.

15. An optical frequency multiplexing circuit comprising:

optical coupler means for combining at least two optical inputs which are amplitude-modulated at a frequency particular for each of said optical imputs into a single optical output;

optical splitter means for splitting an optical input at least into two optical outputs;

an optical fiber coupled between said optical output of said optical couple means and said optical input of said optical splitter means; and a plurality of optical frequency filters coupled respectively to each of the output ports of said optical splitter means for transmitting only an optical signal at said particular frequency corresponding to a respective one of said optical inputs and for blocking optical signals at said particular frequencies not corresponding to said respective one of said optical inputs, wherein said optical filters each comprise:

optical adding means having first and second input ports and an output port, an optical input signal to be filtered being applied to said first input port;

optical splitting means having an input port and first and second output ports, said first output port of said optical splitting means being coupled to said second input port of said optical adding means, a filtered output signal being produced at said second output port of said optical splitting means;

optical delaying means and optical attenuating means coupled in series with one another between said output port of said optical adding means and said input port of said optical splitting means.

16. An optical frequency multiplexing circuit comprising:

optical coupler means for combining at least two optical inputs which are amplitude-modulated at a frequency particular for each of said optical inputs into a single optical output;

optical splitter means for splittng an optical input at least into two optical outputs;

an optical fiber coupled between said optical output of said optical coupler means and said optical input of said optical splitter means; and a plurality of optical frequency filters coupled respectively to each of the output ports of said optical splitter means for transmitting only an optical signal at said particular frequency corresponding to a respective one of said optical inputs and for blocking optical signals at said particular frequencies not corresponding to said respective one of said optical inputs, wherein said optical filters each comprise:

optical adding means having first and second input ports and an output port, an optical input signal to be filtered being applied to said first input port;

optical splitting means having an input port and first and second output ports, said first output port of said optical splitting means being coupled to said second input port of said optical adding means, a filtered output signal being produced at said second output port of said optical splitting means;

optical delay means coupled betwen said output port of said optical adding means and said input port of said optical splitting means; and optical attenuating means coupled between said first output port of said optical splitting means and said second input port of said optical adding means.

17. An optical frequency multiplexing circuit comprising:

optical coupler means for combining at least two optical inputs which are amplitude-modulated at a frequency particular for each of said optical inputs into a single optical output;

optical splitter means for splitting an optical input at least into two optical outputs;

an optical fiber coupled between said optical output of said optical coupler means and said optical input of said optical splitter means; and a plurality of optical frequency filters coupled respectively to each of the output ports of said optical splitter means for transmitting only an optical signal at said particular frequency corresponding to a respective one of said optical inputs and for blocking optical signals at said particular frequencies not corresponding to said respective one of said optical inputs, wherein said optical filters each comprise:

optical splitting means having an input port and first and second output ports, an output signal to be filtered being applied to said input port;

optical adding means having first and second input ports and an output port, a filtered output signal being produced at said output port of said optical adding means;

optical delaying means coupled between said first output port of said optical splitting means and said first input port of said optical adding means; and optical attenuating means coupled between said second input port of said optical adding means and said second output port of said optical splitting means.

18. An optical frequency multiplexing circuit comprising: optical coupler means for combining at least two optical inputs which are amplitude-modulated at a frequency particular for each of said optical inputs into a single optical output; optical splitter means for splitting an optical input at least into two optical outputs; an optical fiber coupled between said optical output of said optical coupler means and said optical input of said optical splitter means; and a plurality of optical frequency filters coupled respectively to each of the output ports of said optical splitter means for transmitting only an optical signal at said particular frequency corresponding to a respective one of said optical inputs and for blocking optical signals at said particular frequencies not corresponding to said respective one of said optical inputs, wherein said optical filters each comprise: optical splitting means having an input port and first and second output ports, an optical signal to be filtered being applied to said input port; optical adding means having first and second input ports and an output port, said second input port of said optical adding means being coupled to said second output port of said splitting means, a filtered output signal being produced at said output port of said optical adding means; and optical delaying means and optical attenuating means coupled in series with one another between said first output port of said optical splitting means and said first input port of said optical adding means.

* * * * *